United States Patent [19]

Smith

[11] 4,118,363

[45] Oct. 3, 1978

[54] HALOGENATED DIPHENYL ETHER SOLVENTS FOR CRYSTALLINE POLYMERS

[75] Inventor: Harry A. Smith, Midland, Mich.

[73] Assignee: The Dow Chemical Company, Midland, Mich.

[21] Appl. No.: 851,909

[22] Filed: Nov. 16, 1977

[51] Int. Cl.$^2$ ................................................ C08K 5/06
[52] U.S. Cl. ................................................ 260/33.2 R
[58] Field of Search .................................. 260/33.2 R

[56] References Cited

U.S. PATENT DOCUMENTS

| | | | |
|---|---|---|---|
| 3,254,047 | 5/1966 | Caldwell et al. | 260/33.2 R |
| 3,380,951 | 4/1968 | Frey | 260/33.6 |
| 3,755,467 | 8/1973 | Darsow et al. | 260/33.2 R |

OTHER PUBLICATIONS

Dow Chemical Co., Technical Data Sheet on Phenylene Sulfide Polymer (1964); pp. 1 and 2.

*Primary Examiner*—Harry Wong, Jr.
*Attorney, Agent, or Firm*—Ralph M. Mellom; Michael L. Glenn

[57] ABSTRACT

Crystalline polymers are readily dissolved in chlorinated diphenyl ether solvents. These solvents and in particular the isomers of chlorodiphenyl ether are especially suitable as solvents for polyarylene sulfides. These solvents are biodegradable and can be conveniently used as alternatives to polychlorobiphenyl solvents.

9 Claims, No Drawings

HALOGENATED DIPHENYL ETHER SOLVENTS FOR CRYSTALLINE POLYMERS

BACKGROUND OF THE INVENTION

This invention relates to a solution of crystalline polymers in halogenated diphenyl ethers. In one of its aspects, this invention relates to a solution of polyarylene sulfides in such ethers.

Many crystalline polymers dissolve slowly or only to a relatively low percentage in common organic solvents. In particular, crystalline polyarylene sulfides have heretofore been known to be nearly insoluble in common organic solvents. The insolubility of polyarylene sulfides has created considerable difficulty in purification and solvent casting of these polymers.

It is known in the art that crystalline, linear polymers of arylene sulfides are slightly soluble, i.e., to a weight concentration of about 2 percent, in diphenyl ether at about 200° C. Dow Chemical Company Technical Data Sheet on QX 4375.1 (1964). U.S. Pat. No. 3,317,487 discloses that polyphenyl compounds are suitable and chlorinated biphenyl compounds preferred as solvents for polyarylene sulfides. The best known solvents for the polyarylene sulfides are reported in *Encyclopedia of Polymer Science and Technology*, Vol. 10, p. 656 (1969) to be chlorobiphenyl (PCB) solvents. The use of chlorobiphenyl compounds has recently been restricted for environmental reasons.

In view of the deficiencies in the aforementioned prior art solvents for polyarylene sulfides, it would be highly desirable to provide a solvent and a method for dissolving polyarylene sulfides which are not tainted with controversy regarding the environmental hazards of such a solvent and which dissolve an appreciable amount of such polymer. Furthermore, it would be desirable to provide a new solvent and method for dissolving other highly crystalline polymers in appreciable amounts.

SUMMARY OF THE INVENTION

This invention is a solution of crystalline polymers comprising said polymers dissolved in a diphenyl ether solvent having the formula

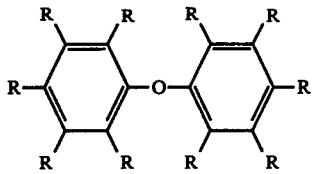

wherein each R is independently at least one member selected from the group consisting of hydrogen, halogen, and alkyl radicals, said alkyl radicals having up to 4 carbon atoms per radical and the total number of carbon atoms in all of said alkyl radicals being within the range of 0 to 8, and at least one of said R substituents is a halogen moiety.

Surprisingly, the halogenated diphenyl ether solvents of the present invention dissolve unexpectedly high concentrations of crystalline polymers. Especially surprising is the success of the solvents of this invention in dissolving such solvent-resistant polymers as polyarylene sulfides. In its preferred embodiments the solutions of the present invention contain weight percent concentrations of polyphenylene sulfide about 10 or more times as great as the concentrations dissolved by the prior art solvent diphenyl ether.

The solutions of crystalline polymers of the invention are useful in the compounding of molding compositions or the solvent-casting of films. For example, it is possible in accordance with the practice of this invention to apply a coating of polyarylene sulfide to various articles.

DETAILED DESCRIPTION OF THE EMBODIMENTS

Although the halogen in the halogenated diphenyl ether solvents employed in the solutions of the present invention can be fluorine, chlorine or bromine, it is preferable that the halogen be chlorine or bromine, chlorine being the halogen of choice. Such a diphenyl ether solvent preferably has only hydrogen and halogen moieties. More preferably the diphenyl ether solvent has no more than 4 halogen moieties and at least one chlorine moiety. The most preferred solvent is a chlorodiphenyl ether isomer or mixture of said isomers.

It is preferred that the foregoing diphenyl ethers when used as solvents are relatively pure compounds or isomeric mixtures or, less preferably, miscible mixtures of suitable solvents selected from the aforementioned diphenyl ether compounds. It is suitable, however, that the solvent mixture contain minor amounts of other less desirable miscible organic compounds which are substantially inert to the cosolvents and solute, such as diphenyl ether.

The foregoing halogenated diphenyl ether compounds can be used as solvents for crystalline polymers. The crystalline polymers suitably dissolved by the method of this invention are generally those crystalline polymers having a solubility parameter in units of the square root of the quantity calories per cubic centimeter in the range of about 7 to about 12.5. These solubility parameters can be determined experimentally or estimated from tabulated values as in Brandrup, J. et al., *Polymer Handbook*, Interscience (1966). Such crystalline polymers include polyethylene, isotactic polypropylene, saran and polyacrolein. The preferred crystalline polymers for use with the method of the present invention are polyarylene sulfides, polyarylene sulfoxides, and, less preferably, polyarylene sulfones. The more preferred polymers are the polyarylene sulfides with the polyphenylene sulfides being the most preferred.

The preferred crystalline polymers of this invention can be employed in the method of the present invention not only as homopolymers such as polyphenylene sulfide, polyphenylene sulfoxide, and the like but also in the dissolution of other polyarylene sulfides, sulfones, and sulfoxides such as polyarylene sulfide copolymers, polyarylene sulfide terpolymers, blends of the foregoing polymers and the like. These preferred polymers can suitably be halogenated, preferably containing 2 or less bromine or chlorine atoms and no other halogens per phenylene group. Advantageously, the molecular weight of the preferred polyarylene sulfide is less than about 50,000 grams per mole as calculated from a measured melt viscosity at 303° C. Such preferred polymers are advantageously substantially linear. It is suitable, however, to employ the method of the present invention to dissolve a low concentration of polyarylene sulfides or sulfoxides cross-linked by a suitable method such as that disclosed in U.S. Pat. No. 3,317,487 to a low degree. Highly cross-linked polymers of arylene sulfides or sulfoxides are virtually insoluble in any solvent, including the solvents of this invention.

It is to be further understood that various additives can be dissolved or dispersed with the crystalline polymers dissolved by the practice of this invention. These additives include various inorganic alkali metal or alkaline earth metal sulfides or oxides which can be added to cross-link or to increase the thermal stability of the resin as well as compounds employed as pigments, fillers, and antioxidants.

The crystalline polymers dissolved in the solutions of this invention can be prepared by any conventional method known to the art or can be purchased from commercial sources. Methods for preparing polyphenylene sulfide resins suitable for use in accordance with the present invention are described in U.S. Pat. Nos. 2,513,188; 2,538,941; 3,274,165; and 3,291,779. A method for preparing the polyphenylene sulfoxide resins suitable for use in accordance with the present invention are described in U.S. Pat. No. 3,326,865.

The method of combining the aforementioned crystalline polymer solute with the halogenated diphenyl ether solvent is not critical to the preparation of solutions of the present invention and any conventional means can be employed. Advantageously, some turbulence or mixing is imparted to the solvent-polymer mixture to facilitate dissolution of the polymer and the undissolved mixture is not so viscous so as to diminish the effectiveness of the mixing. Conveniently, the solvent can be heated to facilitate dissolution after the crystalline polymer and solvent are brought together. When the polymer to be dissoled is a polyarylene sulfide, sulfoxide, or sulfone the solvent is preferably heated to at least about 100° C. during dissolution, more preferably at least about 200° C. The temperature required for appreciable dissolution of the polymer generally increases with increasing molecular weight of the polymer. Advantageously, the polymer can be dissolved at a very high temperature and then the temperature of the solution can be reduced to a value closer to the precipitation temperature of the polymer. Generally, the solvents disclosed in the present invention can be employed at temperatures up to and including the temperature at which the solvent freely refluxes, so long as this temperature does not substantially degrade the polymer to be dissolved.

The pressure and composition of the atmosphere above the solvent in the practice of the method of this invention is generally not critical. Advantageously, the pressure should at least equal atmospheric pressure, so that the boiling point of the solvent is not depressed to a level which is unsuitable for dissolving those polymers which will only dissolve to an appreciable extent at a higher temperature. Conveniently, superatmospheric pressures can be employed to raise the boiling point of a solvent when temperatures in excess of the solvent's boiling point at atmospheric pressures are desired. It is preferable that the atmosphere above the solvent is substantially inert to prevent undesirable side reactions, such as the oxidation of the polyarylene sulfide to the sulfone.

The specific examples that follow illustrate the invention, but are not to be taken as limiting its scope.

EXAMPLE 1

Twenty grams of an isomeric mixture of 85 percent by weight para-chlorodiphenyl ether and 15 percent by weight of the ortho isomer is introduced into a reaction flask equipped with a reflux condenser. Four grams of a phenylene sulfide polymer, sold by Phillips Petroleum Co. under the designation Ryton P-4, having a number average molecular weight of about 10,000 grams per mole as calculated from a measured melt viscosity at 303° C. is added to the chlorodiphenyl ether at a temperature of about 20° C. The mixture of polymer and ether is heated to about 230° C. at which time the polymer dissolves completely to yield a clear homogeneous solution. Precipitation of the polymer occurred when the solution is allowed to cool to about 180° C.

It can be seen from this example that chlorodiphenyl ether is a suitable solvent for concentrations of up to 20 percent by weight polyphenylene sulfide at temperatures above 180° C.

EXAMPLE 2

Twenty grams of the same isomeric mixture of chlorodiphenyl ether employed in Example 1 is introduced into a reaction flask equipped with a reflux condenser. Four grams of a phenylene sulfide polymer with a number average molecular weight of about 7,500 grams per mole as calculated from a measured melt viscosity at 303° C. is added to the chlorodiphenyl ether at a temperature of about 20° C. The mixture of polymer and ether is then heated to a temperature of about 125° C. at which point the polymer completely dissolved. Precipitation of the polymer occurred when the solution is allowed to cool to about 95° C.

It can be seen from this example that phenylene sulfide polymers having a molecular weight less than the polymer in Example 1 can achieve the same polymer concentration in the disclosed solvent at even lower temperatures.

EXAMPLE 3

In the same manner as in Example 1, four grams of phenylene sulfide polymer with a number average molecular weight of about 11,400 grams per mole as calculated from a measured melt viscosity at 303° C. is dissolved in 20 grams of chlorodiphenyl ether. The polymer dissolves at a temperature of about 220° C. and precipitates at a temperature of about 180° C.

EXAMPLE 4

Ten grams of the same isomeric mixture of chlorodiphenyl ether employed in Example 1 is introduced into a reaction flask. Four grams of a saran terpolymer consisting of 92 weight percent vinylidene chloride, 2.5 weight percent methylmethacrylate and 5.5 weight percent acrylonitrile and having a number average molecular weight of 54,000 grams per mole is added to the chlorodiphenyl ether at a temperature of about 20° C. The terpolymer dissolved completely at a temperature of 100° C. and remained in solution at 20° C.

It can be seen from this example that this crystalline polymer with a solubility parameter of about 12 can be dissolved at lower temperatures and to greater concentrations than phenylene sulfide in chlorodiphenyl ether.

EXAMPLE 5

Ten grams of the same isomeric mixture of chlorodiphenyl ether employed in Example 1 is introduced into a reaction flask. Two grams of a polyethylene with a density of 0.95 grams per cubic centimeter and a melt index of about 2.9 is added to the chlorodiphenyl ether at a temperature of about 20° C. The polyethylene dissolved completely at a temperature of about 140° C. and precipitated at a temperature of about 95° C.

It can be seen from this example that this crystalline polymer with a solubility parameter of about 8 can be dissolved at lower temperatures and to a greater concentration than phenylene sulfide in chlorodiphenyl ether.

What is claimed is:

1. A liquid solution comprising a crystalline polymer having a solubility parameter in the range from about 7 to about 12.5 in a diphenyl ether solvent having the formula

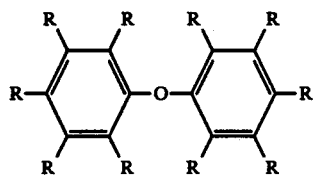

wherein each R is independently at least one member selected from the group consisting of hydrogen, halogen, and alkyl radicals, said alkyl radicals having up to 4 carbon atoms per radical and the total number of carbon atoms in all of said alkyl radicals being within the range from 0 to 8, and at least one of said R substituents is a halogen radical.

2. The solution as defined in claim 1 wherein the diphenyl ether solvent is chlorodiphenyl ether.

3. The solution as defined in claim 1 wherein the crystalline polymer is selected from the group consisting of polyarylene sulfides, polyarylene sulfoxides, and polyarylene sulfones and wherein the R substituents of the diphenyl ether solvent are selected from the group consisting of hydrogen and chlorine radicals, the number of chlorine radicals being in the range from 1 to 4.

4. The solution as defined in claim 1 wherein the crystalline polymer is selected from the group consisting of polyethylene, isotactic polypropylene, saran and polyacrolein.

5. The solution as defined in claim 2 wherein the crystalline polymer is selected from the group consisting of polyarylene sulfides, polyarylene sulfoxides, and polyarylene sulfones.

6. The solution as defined in claim 2 wherein the crystalline polymer is a polyarylene sulfide.

7. The solution as defined in claim 3 wherein the crystalline polymer is a polyarylene sulfide.

8. A method of preparing a liquid solution of a arylene sulfide polymer comprising bringing together said polymer at a temperature at least about 100° C. with a diphenyl ether compound having the formula

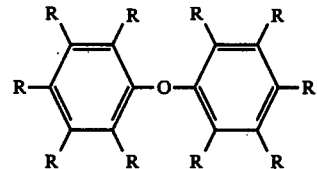

wherein each R is independently at least one member selected from the group consisting of hydrogen, halogen and alkyl radicals, said alkyl radicals having up to 4 carbon atoms per radical and the total number of carbon atoms in all of said alkyl radicals being within the range of 0 to 8, and at least one of said R substituents is a halogen radical.

9. The method as defined in claim 8 wherein the diphenyl ether compound is chlorodiphenyl ether.